United States Patent
Foley et al.

(10) Patent No.: US 12,517,842 B2
(45) Date of Patent: Jan. 6, 2026

(54) IDENTIFYING A SOURCE OF A FUNCTION CALL AND INHERITING ACCESS PERMISSION

(71) Applicant: Texas Instruments Incorporated, Dallas, TX (US)

(72) Inventors: David P. Foley, Sugar Land, TX (US); Venkatesh Natarajan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 84 days.

(21) Appl. No.: 18/637,758

(22) Filed: Apr. 17, 2024

(65) Prior Publication Data
US 2025/0053519 A1   Feb. 13, 2025

Related U.S. Application Data

(60) Provisional application No. 63/532,092, filed on Aug. 11, 2023.

(51) Int. Cl.
*G06F 12/14* (2006.01)
(52) U.S. Cl.
CPC ...... *G06F 12/1458* (2013.01); *G06F 12/1433* (2013.01)
(58) Field of Classification Search
CPC .......................... G06F 12/1458; G06F 12/1433
See application file for complete search history.

(56) References Cited

U.S. PATENT DOCUMENTS

| 8,438,612 | B2 * | 5/2013 | Faitelson | G06F 16/156 |
| | | | | 726/2 |
| 8,539,602 | B2 | 9/2013 | Chowdhury et al. | |
| 2010/0037288 | A1 * | 2/2010 | Carraher | G06F 21/31 |
| | | | | 726/4 |
| 2012/0271853 | A1 * | 10/2012 | Faitelson | H04L 63/101 |
| | | | | 707/783 |
| 2022/0414242 | A1 * | 12/2022 | Passey | G06F 9/547 |
| 2023/0131348 | A1 * | 4/2023 | Landerholm | H04L 9/0877 |
| | | | | 713/168 |
| 2023/0161486 | A1 * | 5/2023 | Pallardy | G06F 12/145 |
| | | | | 711/163 |

* cited by examiner

*Primary Examiner* — Techane Gergiso
(74) *Attorney, Agent, or Firm* — Xianghui Huang; Frank D. Cimino (57) ABSTRACT

Systems and methods provide for inherited access permissions, thereby facilitating read and write access by called contexts. Hardware logic may enforce access permissions in the system. When a processor core executes code associated with a first context, the processor core generates a first hardware signal identifying the first context. The processor core may then switch from the first context to the second context due to the first context calling the second context. The processor core may then generate a second hardware signal identifying the calling (first) context, and then the first hardware signal identifies the called (second) context. The hardware logic that enforces the access permissions may then determine that the second context is being called and that the second context includes either direct access permissions or inherited access permissions associated with the calling (first) context.

20 Claims, 6 Drawing Sheets

IDENTIFYING A SOURCE OF A FUNCTION CALL AND INHERITING ACCESS PERMISSION

CROSS-REFERENCE TO RELATED APPLICATIONS

The present application claims the benefit of U.S. Provisional Application 63/532,092, filed Aug. 11, 2023, the disclosure of which is hereby incorporated by reference in its entirety.

TECHNICAL FIELD

The present application is related, generally, to read operations and write operations directed to memory and, more specifically, to enforcing access permissions of the memory based on context identity.

BACKGROUND

Embedded code may be separated into different contexts, where access permissions of each context to memory regions may differ. For instance, code may be split into a first context for the main application, a second context for a communication protocols stack, and a third context for library functions that may be called throughout the application by multiple contexts.

The access permissions may allow the first context to access a first memory region but not a second memory region and may allow the second context to access the second memory region but not the first memory region. In one example, if the third context is allowed to access both the first memory region and the second memory region, then that may set up a situation in which access permissions may be worked around. For instance, the first context may be able to call the third context to read or write to the second memory region.

There is a need in the art for more robust access permission enforcement.

SUMMARY

In one embodiment, an apparatus includes: a processor core; hardware logic coupled to the processor core; memory coupled to the hardware logic and having a plurality of memory regions; and a first register configured to identify a direct access permission of a first memory region of the memory and a second register configured to identify an inherited access permission of the first memory region; wherein the hardware logic is configured to: receive a memory access request from the processor core, wherein the memory access request corresponds to the first memory region; receive, from the processor core, an identifier of a first context associated with the memory access request; determine whether the identifier of the first context matches information in the second register; receive a hardware signal from the processor core, the hardware signal including an identifier of a second context; in response to determining that the identifier of the first context corresponds to the information in the second register, determine whether the identifier of the second context corresponds to information in the first register; and allow the memory access request to proceed based on determining whether the identifier of the second context corresponds to the information in the first register.

In another embodiment, a method is performed by hardware logic, and the method includes: receiving a memory access request from a processing unit, wherein the memory access request is directed to a first memory region; receiving a first hardware signal identifying a first context associated with the memory access request; determining whether the first context has an inherited access permission for the first memory region; receiving an identifier of a calling context from a second hardware signal from the processing unit; determining whether the calling context has direct access permission to the first memory region, based at least in part upon the first context having the inherited access permission; and determining whether to allow or deny the memory access request based at least in part on whether the calling context has direct access permission to the first memory region.

In yet another embodiment, an apparatus includes: a first register configured to indicate direct access permission with respect to a plurality of contexts and a plurality of memory regions; a second register configured to indicate inherited access permission with respect to the plurality of memory regions; hardware logic configured to enforce access to the plurality of memory regions, wherein the hardware logic is further configured to: receive an access request for a first memory region of the plurality of memory regions and an identifier of a first context associated with the access request; determine whether the first context has inherited access permission for the first memory region, including checking the identifier of the first context against information in the second register; in response to determining that the first context has inherited access permission for the first memory region, determine whether an identifier of a second context, received via a hardware signal from a processor core, has direct access permission to the first memory region; and determine whether to allow or deny the access request based at least in part on whether the identifier of the second context has direct access permission to the first memory region.

BRIEF DESCRIPTION OF THE DRAWINGS

Having thus described the invention in general terms, reference will now be made to the accompanying drawings, wherein:

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Various embodiments provide systems and methods to identify a source of a function call and to inherit access permissions. Such systems and methods may provide for more robust access permission enforcement in some embodiments.

In one example, a first context (C1) may include application code, a second context (C2) may include something outside of the main application code, such as communications stack code, and a third context (C3) may include common code to be accessed by either or both of C1 or C2. Further in this example, C1 has access permissions for a first memory region (M1) but not for a second memory region (M2), and context C2 has access permissions for M2 but not for M1.

Continuing with the example, hardware logic may be configured to enforce access to the memory regions M1 and M2 based on context identity, including inherited access. The first context C1 may use a piece of common code in context C3 to perform a memory access, such as a read operation or a write operation, to M1. However, context C3 may not have direct access permissions to read or write to M1. The processor core may execute instructions corresponding to C1, and then switch contexts to execute code corresponding to C3 as part of the function call from C1 to C3. In doing so, the processor core may provide a first hardware signal indicating that C3 is executing and may provide a second hardware signal indicating that C1 is the calling context. For instance, the processor core may save the identity of C1 to a register, where that register corresponds to the second hardware signal.

Further continuing with the example, the hardware logic may include access protection logic, which compares the identity of C3 from the first hardware signal to direct access permissions. The access protection logic may then determine that C3 does not have direct access permissions, instead looking to inherited access permissions, which indicate that C3 does have inherited access permissions. In response, the access protection logic may look to the second hardware signal to determine that C1 is the calling function. Since C1 has direct access to M1, the access protection logic allows context C3 to inherit the direct access permission of context C1. The access protection logic then allows the memory access to proceed.

Various embodiments may provide advantages over other solutions. For instance, the inherited access permissions, described above, may allow for one context to inherit permissions when it is called. However, that context may not retain permissions when it is not called. Therefore, various embodiments may provide flexibility and security by allowing called functions to temporarily inherit access permissions.

Additionally, various embodiments may allow for ease of use of common code in secure systems having context-by-context access permissions. Specifically, while it may be tempting to implement a unique copy of a function in each context, that may create an overly complex compile time scenario and may be wasteful of on-chip memory because the machine code instructions and data would be duplicated across the different contexts. Instead, various embodiments may allow commonly used functions to be placed in a common code context, where that common code context may be called from time to time and, by virtue of inherited access, may conform to security measures.

Figure 1:
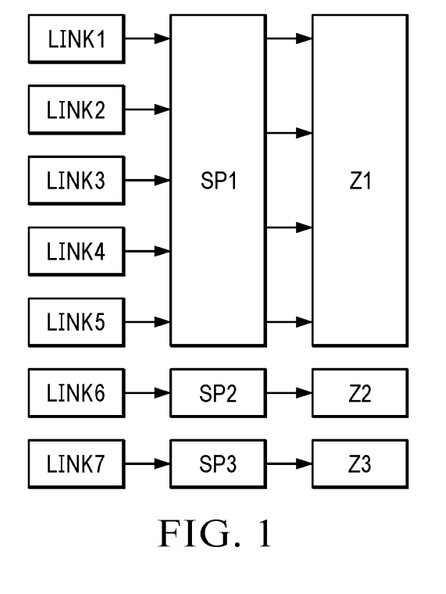
FIG. 1 is an illustration of example links, stacks, and zones, according to various embodiments.

FIG. 1 is an illustration of example links, stacks, and zones, according to various embodiments. There are seven links, link 1-link 7. There are three stacks (SP), stack 1-stack 3. There are also three zones (Z), zone 1-zone 3.

Each one of the links is a collection of address ranges. For instance, there may be one or more memories, such as on-chip flash, that store machine code instructions and data for execution. Each link refers to an address range or multiple address ranges of the machine code instructions and data, and instructions stored within the addresses of a given link may share a single set of permissions. During execution, a link may be referred to as a context, and a single program may have code and/or data stored in any number of links/contexts.

A stack is a concept in some programming languages (such as C programming), and it also refers to address ranges. In C programming and some other programming languages, a stack is a data structure that follows the Last In, First Out (LIFO) principle. The stack is used for managing function calls, local variables, and maintaining the program's execution. For example, when a function is called, its local variables and the return addresses are pushed onto the stack. When the function completes, these values are popped off the stack. In another example, the stack is used to keep track of where the program is in its execution and to manage the flow of control between different parts of the program. In some examples, each program may have its own associated unique stack, although any number of programs may share a given stack.

Zones in this example are a segregation concept for development. For instance, a processor may have access enforcement, where some users are able to access some zones but not other zones, and user permissions may be different among different users. As illustrated in FIG. 1, links 1-5 are all associated with stack 1. Stack 1 is associated with zone 1. Link 6 is associated with stack 2, which is associated with zone 2. Link 7 is associated with stack 3, which is associated with zone 3. The scope of embodiments may include zone 3 being configured for use only by a manufacturer of a device. Furthermore, the scope of embodiments may include zone 2 having some other lesser security, such as being configured for use by the manufacturer as well as by some trusted downstream business partners. Additionally, the scope of embodiments may include zone 1 having even lesser security, such as being open to various authorized third-party application programmers. In such embodiments, the authorized third-party application programmers would not be able to access zone 2 or zone 1. In many examples, a given zone is associated with more than one program.

Put another way, links may act as a memory protection unit for memory and peripherals. Stacks may complete a hardware context separation. Zones may govern development time segregation, such as for debugging, firmware updates, security updates, and the like. The number of links, stacks, and zones may vary from device to device, so that the number of links, stacks, and zones of FIG. 1 is for illustration purposes.

The relationships between links, stacks, and zones may be defined using information in registers. For instance, a security control unit (e.g., as in FIG. 2) may include a multitude of registers with information to define links, stacks, and zones.

Figure 2:
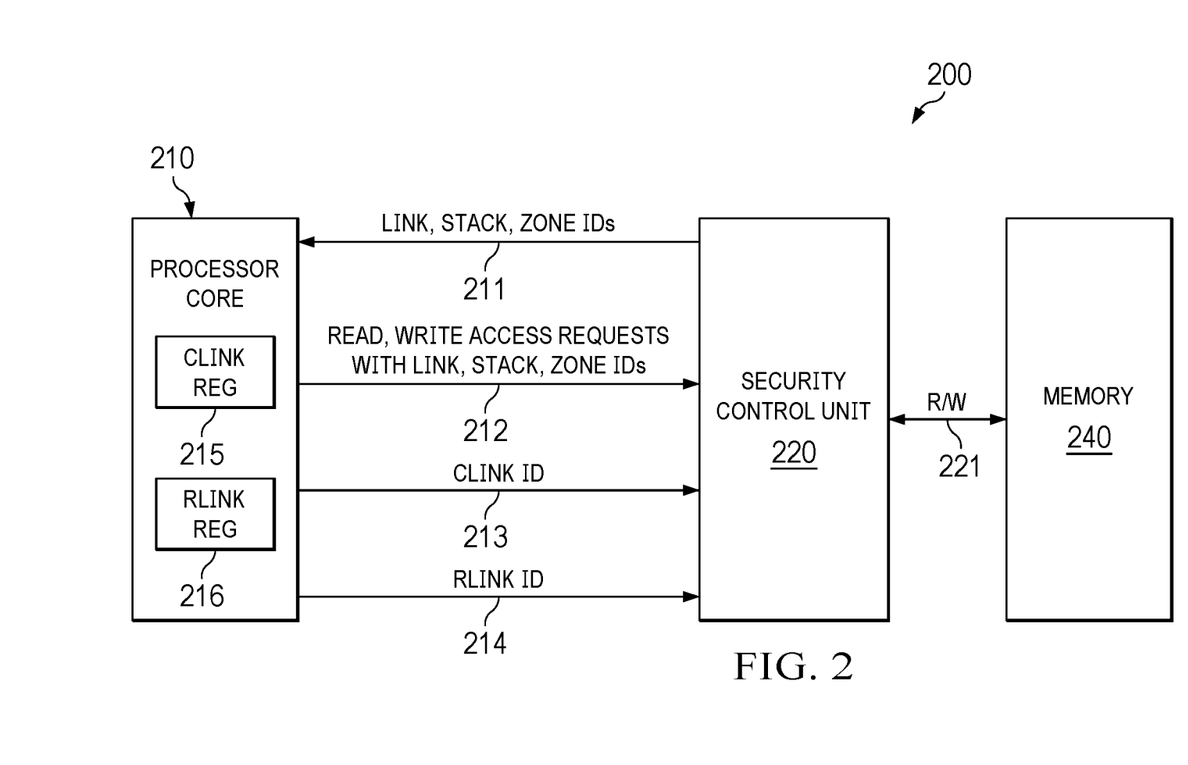
FIG. 2 is an illustration of an example system, according to various embodiments.

FIG. 2 is an illustration of example system 200, according to various embodiments. System 200 may be implemented on one or more semiconductor dies. For instance, the processor core 210, the security control unit 220, and the memory 240 may be implemented as a system on-chip (SOC) or may be implemented using one or more separate dies in a semiconductor package. One example use case is an embedded system, such as an advanced microcontroller unit (MCU), which may be intended for use in an automobile, an industrial machine, or the like. However, the scope of implementations is not limited to any particular use case, such as an embedded system or otherwise.

Processor core 210 may be a general-purpose processor core, a reduced instruction set computer (RISC), an application-specific integrated circuit (ASIC), or any other appropriate processing unit. Processor core 210 fetches instructions and data from memory 240 and then executes those instructions using a processing pipeline. A processing pipeline may include, e.g., a fetch stage, a decode stage, a read stage, an execute stage, a write stage, and or the like. The processing pipeline is not limited to any specific implementation.

The security control unit 220 enforces access permissions to the memory 240. For instance, the processor core 210 may send a read access request 212 to the security control unit 220. The security control unit 220 may determine whether the read or write access request conforms to the access permissions and may then either allow or deny the access request 212.

Memory 240 may be an on-chip memory, an off-chip memory, or any other appropriate memory. In this example, memory 240 includes a plurality of memory regions to which the processor core 210 may read or write through a plurality of read or write operations 221. Also, while memory 240 is shown as a single memory, that is for ease of illustration, and it is understood that memory 240 may include ranges of addresses across multiple memory devices. The security control unit 220 may include an array of registers, which store information indicating memory region access. This is described in more detail with respect to FIG. 3.

In one example, the processor core 210 fetches instructions and data from memory 240, e.g., on-chip flash, by providing an access request to the security control unit 220. The instructions and data are stored in a particular address range in the memory 240, where that particular address range corresponds to a link, such as discussed above with respect to FIG. 1. The security control unit 220 monitors the instruction bus, parses the information in the fetch, and determines that the fetch corresponds to a particular link, stack, and zone. The security control unit 220 then passes link identification, stack identification, and zone identification information back to the processor core 210 using hardware signal 211.

Continuing with the example, the processor core 210 begins processing the instructions and data according to its processing pipeline. The processing pipeline may generate one or more read or write access requests on hardware signal 212. The processor core 210 may include link identification, stack identification, and zone identification information in the hardware signal 212. The security control unit 220 may then use that link identification, stack identification, and zone identification in signal 212 for purposes of access permission enforcement. For instance, if the link (which may be referred to as a context during runtime) has access to a particular memory region, then the security control unit 220 may allow the access request; otherwise, the security control unit 220 may deny the access request. A read or write operation, being performed, is illustrated by read write operation 221.

In another example, instructions in a context may call another context. For instance, a first instruction in a first context C1 may call a second instruction in a second context C3. Processor core 210 is configured to store the identity of the calling context (C1) in CLINK register 215. Processor core 210 is also configured to output hardware signal 213, which carries the information from the CLINK register 215, thereby allowing security control unit 220 to determine a calling context identity from hardware signal 213. Processor core 210 also includes RLINK register 216, in which it may store identifying information for a returning link. The returning link identifying information may be output by the processor core 210 on hardware signal 214. The RLINK information is described in more detail with respect to FIG. 6.

The hardware signals 211-214 in this example include one or more bits transmitted on one or more buses from one piece of hardware logic to another. The bits may be transmitted in parallel or serially, depending on the particular architecture. Therefore, the communications and actions described with respect to FIGS. 2-4 may be performed without use of firmware or software functionality in some instances.

Figure 3:
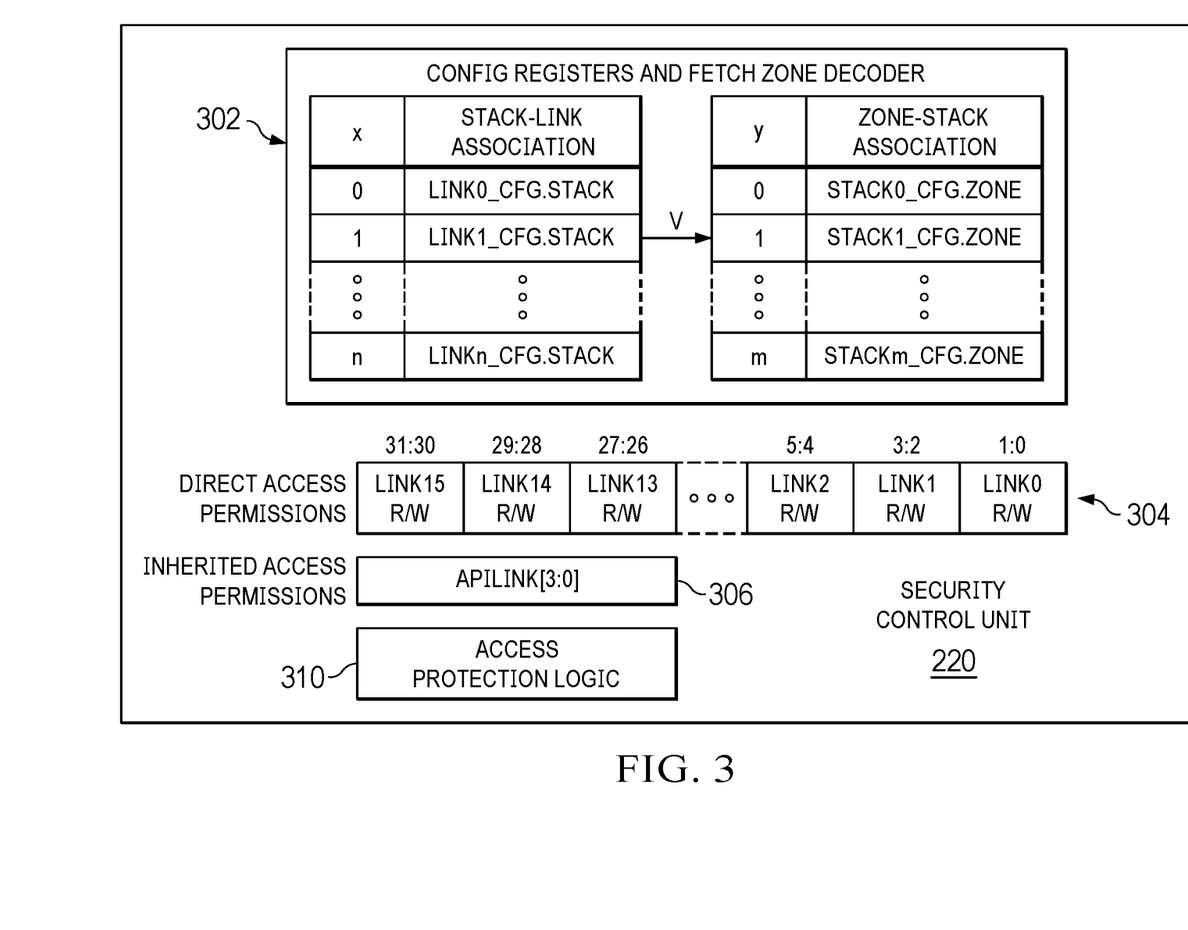
FIG. 3 is an illustration of an example implementation of a security control unit, according to various embodiments.

FIG. 3 is an illustration of an example implementation of security control unit 220, according to various embodiments. Security control unit 220 includes configuration registers and fetch zone decoder 302. Configuration registers and fetch zone decoder 302 includes an array of registers that store information indicating associations between zones and stacks and between stacks, links, and address ranges. When the processor core 210 provides a request to fetch an instruction, that fetch request may be monitored by the security control unit 220, and the address information in the fetch request may be used to determine link identification, stack identification, and zone identification information using configuration registers and fetch zone decoder 302. The security control unit 220 may then transmit the link identification, stack identification, and zone identification information on hardware signal 211.

Register 304 is a direct access permission register for a particular memory region. The example register 304 includes a bit for each link, which in this illustration includes 16 links, 0-15. There may be as many registers 304 as there are memory regions. Register 304 may be configured to indicate direct access permissions by, e.g., storing a digital 1 to a bit which corresponds to a particular link (for permission) and storing a digital zero to a bit corresponding to another link (for no permission). Of course, the scope of implementations is not limited to any particular way to configure a register to indicate direct access permissions.

In one example, the processor core 210 may transmit a memory access request on signal 212 to the security control unit 220. That memory access request on signal 212 may include a target memory address and link identification, stack identification, and zone identification information for a context that resulted in the memory access request. The security control unit 220 may then determine the respective access permission register 304 based on the target memory address, compare the link identification information to the bits in register 304, then either allow or deny the memory access based on the direct access permissions in register 304.

Register 306 is an inherited access permissions register for a particular memory region. There may be as many registers 306 as there are memory regions. The inherited access permissions register 306 may include information identifying one or more links that may inherit permissions from other links. For instance, if an instruction in a first context C1 calls another instruction in context C3, and C3 issues a read or write access request, security control unit 220 may then compare the link identification information of context C3 to the direct access permissions register 304 associated with the target memory address. If there is no match between the link ID and a positive indication of permission in register 304, then security control unit 220 may then look to the register 306 associated with the target memory address. Register 306 may indicate that the link identification associated with context C3 may inherit permissions (or not).

Assuming that context C3 may inherit permissions, then the security control unit 220 may compare the link identification information to the hardware signal 213, which indicates a calling link identification. The calling link identification indicates from which link the present context (C3) inherits direct permissions. Continuing with the example, the CLINK register 215 and hardware signal 213 may identify the link associated with context C1, and assuming that the link associated with context C1 has direct access permissions indicated in register 304, then security control unit 220 may allow instructions in C3 to have read or write access to the memory region even if these instructions in C3 do not have directed access to the memory region.

The information in registers 304 and 306 may be set during any appropriate time. For instance, the information in registers 304 and 306 may be set during manufacture of system 200. In another example, the information in registers 304 and 306 may be set for some links and some memory regions during manufacture of system 200, whereas the system may still allow for some access permissions to be set during development.

Access protection logic 310 is hardware logic of security control unit 220. Access protection logic 310 may receive hardware signals 212-214 and then either determine to allow access to a particular memory region or not.

Figure 4:
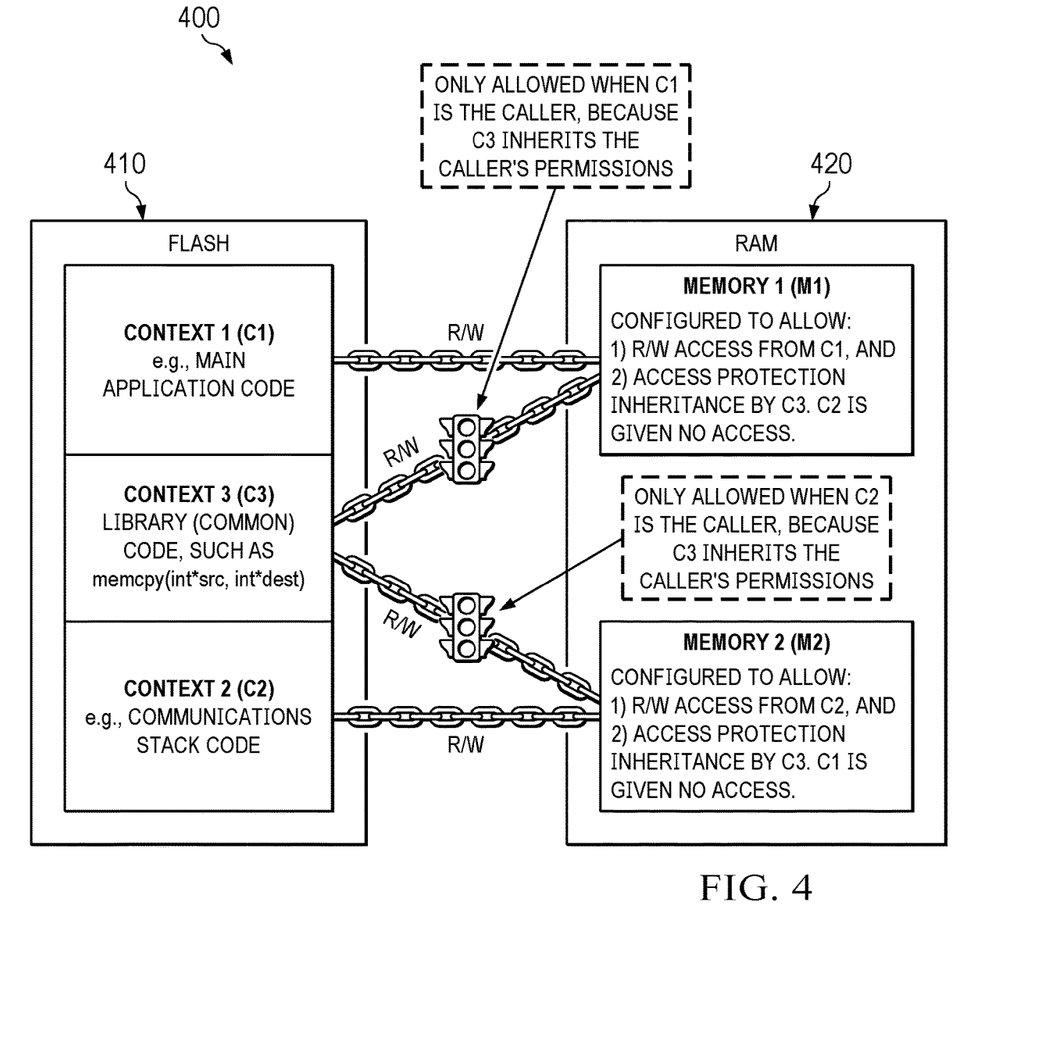
FIG. 4 is an illustration of example access permissions, according to various embodiments.

FIG. 4 is an illustration of an example access permissions 400, according to various embodiments. The actions discussed with respect to access permissions 400 may be performed by the access protection logic 310 of FIG. 3.

In the example of FIG. 4, RAM 420 corresponds to memory 240 of FIG. 2. RAM 420 includes multiple memory regions, shown as memory region 1 (M1) and memory region 2 (M2). Of course, a given RAM may include any appropriate number of memory regions, and FIG. 4 shows only two for ease of illustration.

Flash memory 410 may include non-chip flash memory or some other appropriate memory in which machine code instructions and data are stored. Context 1 (C1) corresponds to main application code. As explained above, C1 also corresponds to a link, stack, and zone, where the link and stack are associated with address ranges within flash 410.

Further in the example, context 2 (C2) corresponds to communications stack code. C2 also corresponds to a link, stack, and zone, where at least the link identification is different from a link identification associated with C1.

Context 3 (C3) includes a library of common code. The common code may include functions that may be expected to be accessed by both C1 and C2 from time to time. One example includes a memory copy (memcpy), though the scope of implementations may include any appropriate function in a library of common code. Further, while FIG. 4 only shows three contexts, it is understood that various implementations may include any appropriate number of contexts, each with their own permissions.

Memory region M1 is configured to allow read or write access from C1 (as may be indicated in register 304) and access protection inheritance by C3 (as may be indicated in register 306). However, C2 is not given access according to the information in either register 304 or 306. Similarly, memory region M2 is configured to allow read and write access from C2 (as may be indicated in register 304) and access protection inheritance by C3 (as may be indicated in register 306). However, C1 is not given access to M2.

In one example, a first instruction in context C1 makes a function call to context C3 to perform a memory copy function on M1. Processor core 210 executes machine code instructions of C1 during runtime and then changes over to C3 according to the function call. Processor core 210 then writes the identification of the link corresponding to the calling context C1 into CLINK register 215.

With processor core 210 now executing instructions of context C3, it transmits the link identification associated with context C3 on hardware signal 212 when it sends a read or write request to security control unit 220. Furthermore, the hardware signal 213 identifies the link ID associated with context C1.

In response to receiving the read or write request directed to a target memory address, the access protection logic 310 may then compare the link ID of context C3 to the direct access permissions of register 304 associated with the target memory address. Register 304 does not indicate a direct access permission for context C3. The access protection logic 310 may then compare the link ID of context C3 to the inherited access permissions information in register 306 associated with the target memory address. In this example, there is a match between the link ID of context C3 and the inherited access permissions information register 306. Based on the match, the access protection logic 310 may then compare the CLINK identification information (identifying C1) on hardware signal 213 to the direct access permissions of register 304. The register 304 indicates direct access permission for the link associated with C1. The access protection logic 310 then allows the read or write access to M1, as illustrated by read or write operation 221 of FIG. 2.

Of course, access protection logic 310 may deny access in some instances. For instance, if neither C3 nor C1 has direct access permissions for M1, then the read or write request would be denied by access protection logic 310. Furthermore, context C2 may use a similar process to call C3 to perform a function on memory region M2. However, even with inherited permissions, C1 may not perform a read or write operation on M2, and C2 may not perform a read or write operation on M1, as enforced by access protection logic 310.

Figure 5:
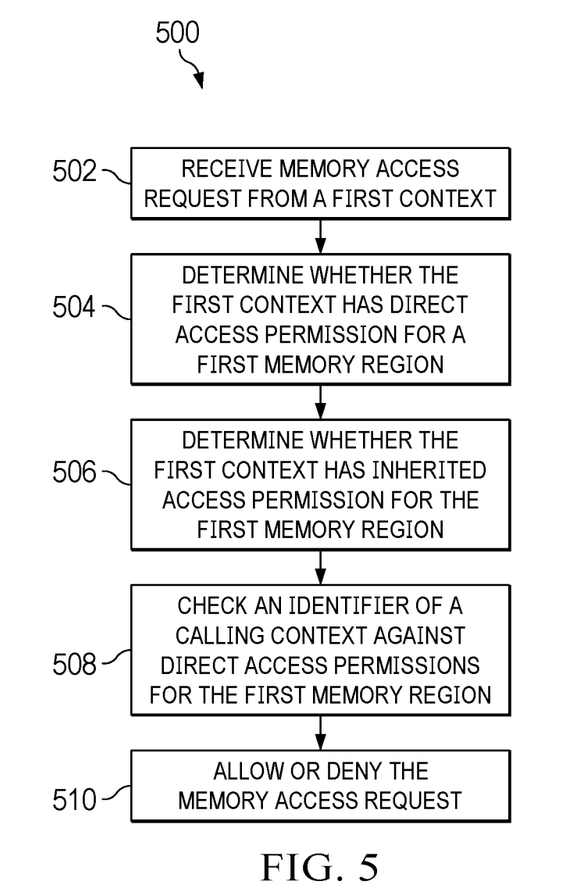
FIG. 5 is an illustration of an example method for enforcing access permissions, according to various embodiments.

FIG. 5 is an illustration of an example method 500, for enforcing access permissions, according to various embodiments. The actions of method 500 may be performed by, e.g., hardware logic, such as access protection logic 310, in security control unit 220. In one example, the hardware logic is implemented using aggregations of logic gates into one or more logic units, where those logic units are in communication with buses to receive hardware signals and to transmit hardware signals. Such actions may not require intervention by software or firmware functionality in this example.

At action 502, the access protection logic receives a memory access request from an instruction in a first context. In the example of FIG. 4, the first context may be C3, as it issues an access request to either read or write to a target address in memory region M1.

At action 504, the access protection logic determines whether the first context has direct access permission for a first memory region. For instance, the access protection logic may check a link ID associated with the first region (as received on a hardware signal) against information stored in one or more registers (e.g., register 304) associated with the target address.

If there is no direct access permission in action 504, at action 506, the access protection logic determines whether the first context has inherited access permission for the first memory region. In the example of FIG. 4, the context C3 does not have direct access permissions for M1, but it does include inherited access permissions, as given by the information in a register 306 associated with the target address.

If the context C3 includes inherited access permissions according to register 306, at action 508, the access protection logic may check an identifier of a calling context. In the example of FIG. 2, the identifier of the calling context may be transmitted on hardware signal 213, and it may carry information that is saved to CLINK register 215. The access protection logic may compare the link identifier associated with the calling context (e.g., C1) against the direct access permissions for the first memory region. In the example of FIG. 4, the calling context C1 has direct access permissions for M1, as provided by register 304.

At action 510, the access protection logic may allow or deny the memory access request based on the results of actions 504-508. For instance, the access protection logic may determine that the calling context has direct access permission to the particular memory region, such as C1 having direct access permission to the memory region M1. In such an instance, the access protection logic may then allow a read or a write operation to the memory region M1.

The scope of implementations is not limited to the specific series of actions shown in FIG. 5. Rather, some implementations may add, omit, rearrange, or modify one or more of the actions. In one example, if actions 504 and 506 indicate no direct access or inherited access, then permission may be denied, even without reaching the other actions 508, 510. In another example, if the identifier of the calling context is not associated with direct access permission at action 508, then access may be denied without reaching action 510.

In yet another example, the principles discussed herein may be adapted for use with peripheral access as well as memory regions. For instance, the security control unit 220 may include registers that indicate direct access permission and inherited access permission to various peripheral utilities for one or more links. The actions discussed above may be performed to allow or deny access to peripheral utilities based on direct permission access and indirect permission access in the same way that access may be allowed or denied for memory regions.

Figure 6:
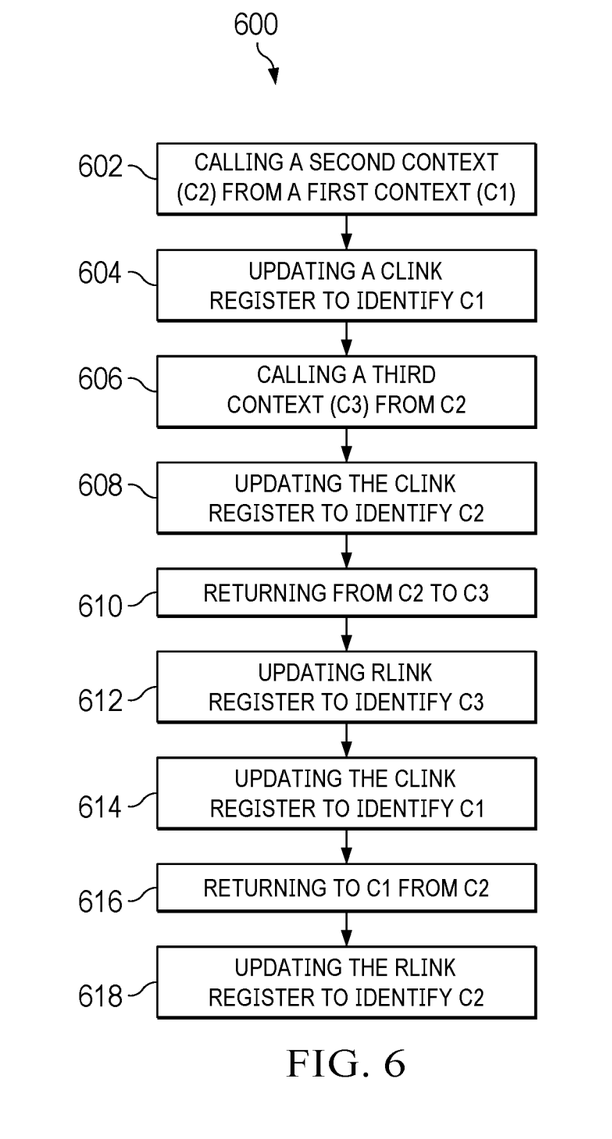
FIG. 6 is an illustration of example method for using a CLINK register and an RLINK register, according to various embodiments.

Various embodiments may allow for use of the CLINK register 215 and/or the RLINK register to 16 (FIG. 2) during software or firmware operations. FIG. 6 is an illustration of example method 600, for using a CLINK register and a RLINK register, according to various embodiments. The actions of method 600 may be performed by a processor core, such as the processor core 210 of FIG. 2.

Method 600 starts with the processor core processing machine code instructions and data of the first context C1. At action 602, the first context C1 calls a second context (C2). For instance, C1 may make a function call to C2, and the processor core may begin processing C2 data and machine code instructions.

At action 604, the processor core may update a CLINK register to identify C1 as the calling context. At action 606, the second context C2 may call a third context C3. Actions 602-606 represent a nested calling operation.

At action 608, the processor core updates the CLINK register to identify C2 as the calling context. The processor core may also begin processing C3 data and machine code instructions. Action 610, C3 completes its function and returns operation to C2. The processor core may then begin processing C2 data and machine code instructions and then update the RLINK register to identify C3 as the returning link at action 612. At action 614, the processor core may update the CLINK register to identify C1 as the calling context of the instructions in C2 that are currently executing. Action 614 is performed so that processing eventually returns to C1, which is the first calling function.

At action 616, the context C2 completes its function, and processing returns to C1 from C2. The processor core may begin processing machine instructions and data for context C1. The processor core may also update the RLINK register to identify C2 as the returning link.

The functionality provided by method 600 may be used during code execution to provide security benefits. For instance, C1 may include code to check the RLINK register after action 618. C1 may check the RLINK register to ensure that the return did, indeed, come from C2. If the RLINK register identifies any other context, then that may indicate a security issue. The context C1 may include code to continue processing based on the match or to take some other action in the case of a mismatch. An example of other action may include issuing an error, restarting, or the like. Similarly, a function that is called, such as C2, may check the CLINK register against the context to which it returns (e.g., C1). A mismatch may indicate a security issue, and action may be taken.

The term "semiconductor die" is used herein. A semiconductor device can be a discrete semiconductor device such as a bipolar transistor, a few discrete devices such as a pair of power FET switches fabricated together on a single semiconductor die, or a semiconductor die can be an integrated circuit with multiple semiconductor devices such as the multiple capacitors in an A/D converter. The semiconductor device can include passive devices such as resistors, inductors, filters, sensors, or active devices such as transistors. The semiconductor device can be an integrated circuit with hundreds or thousands of transistors coupled to form a functional circuit, for example a microprocessor or memory device. The semiconductor device may also be referred to herein as a semiconductor device or an integrated circuit (IC) die.

The term "semiconductor package" is used herein. A semiconductor package has at least one semiconductor die electrically coupled to terminals and has a package body that protects and covers the semiconductor die. In some arrangements, multiple semiconductor dies can be packaged together. For example, a power metal oxide semiconductor (MOS) field effect transistor (FET) semiconductor device and a second semiconductor device (such as a gate driver die, or a controller die) can be packaged together to from a single packaged electronic device. Additional components such as passive components, such as capacitors, resistors, and inductors or coils, can be included in the packaged electronic device. The semiconductor die is mounted with a package substrate that provides conductive leads. A portion of the conductive leads form the terminals for the packaged device. In wire bonded integrated circuit packages, bond wires couple conductive leads of a package substrate to bond pads on the semiconductor die. The semiconductor die can be mounted to the package substrate with a device side surface facing away from the substrate and a backside surface facing and mounted to a die pad of the package substrate. The semiconductor package can have a package body formed by a thermoset epoxy resin mold compound in a molding process, or by the use of epoxy, plastics, or resins that are liquid at room temperature and are subsequently cured. The package body may provide a hermetic package for the packaged device. The package body may be formed in a mold using an encapsulation process, however, a portion of the leads of the package substrate are not covered during encapsulation, these exposed lead portions form the terminals for the semiconductor package. The semiconductor package may also be referred to as a "integrated circuit package," a "microelectronic device package," or a "semiconductor device package."

While various examples of the present disclosure have been described above, it should be understood that they have been presented by way of example only and not limitation. Numerous changes to the disclosed examples can be made in accordance with the disclosure herein without departing from the spirit or scope of the disclosure. Modifications are possible in the described embodiments, and other embodiments are possible, within the scope of the claims. Thus, the breadth and scope of the present invention should not be limited by any of the examples described above. Rather, the scope of the disclosure should be defined in accordance with the following claims and their equivalents.

What is claimed is:

1. An apparatus comprising:
   a processor core;
   hardware logic coupled to the processor core;
   memory coupled to the hardware logic and having a plurality of memory regions; and
   a first register configured to identify a direct access permission of a first memory region of the memory and a second register configured to identify an inherited access permission of the first memory region;
   wherein the hardware logic is configured to:
      receive a memory access request from the processor core, wherein the memory access request corresponds to the first memory region;
      receive, from the processor core, an identifier of a first context associated with the memory access request;
      determine whether the identifier of the first context corresponds to information in the second register;
      receive a hardware signal from the processor core, the hardware signal including an identifier of a second context;
      in response to determining that the identifier of the first context corresponds to the information in the second register, determine whether the identifier of the second context corresponds to information in the first register; and
      determine whether to allow the memory access request to proceed based on determining whether the identifier of the second context corresponds to the information in the first register.

2. The apparatus of claim 1, wherein the processor core is configured to:
   execute instructions associated with the second context;
   execute instructions associated with the first context in response to a function call from the second context to the first context; and
   store the identifier of the second context in a third register of the processor core, wherein the third register is associated with the hardware signal.

3. The apparatus of claim 1, wherein the processor core is configured to:
   update a value stored in a third register upon a function call from the second context to the first context, wherein the third register is associated with the hardware signal.

4. The apparatus of claim 1, wherein the first context is associated with a shared library.

5. The apparatus of claim 1, wherein the second context is associated with code of an application.

6. The apparatus of claim 1, wherein the first register comprises a first plurality of bits, further wherein the first plurality of bits is configured to indicate that the second context has direct access to the first memory region.

7. The apparatus of claim 6, wherein the first plurality of bits is configured to indicate that the second context does not have direct access to a second memory region of the memory.

8. The apparatus of claim 6, wherein the second register comprises a second plurality of bits, further wherein second plurality of bits is configured to indicate that the first context has inherited access to the first memory region.

9. The apparatus of claim 1, wherein the hardware logic is further configured to:
   determine whether the identifier of the first context corresponds to the information in the first register; and
   perform the determining of whether the identifier of the first context corresponds to information in the second register in response to determining that the identifier of the first context does not match the information in the first register.

10. The apparatus of claim 1, wherein the first context is associated with a first range of memory addresses in on-chip memory, and wherein the second context is associated with a second range of memory addresses in the on-chip memory.

11. The apparatus of claim 1, wherein the first register and the second register are implemented in the hardware logic.

12. A method performed by hardware logic, the method comprising:
   receiving a memory access request from a processing unit, wherein the memory access request is directed to a first memory region;
   receiving a first hardware signal identifying a first context associated with the memory access request;
   determining whether the first context has an inherited access permission for the first memory region;
   receiving an identifier of a calling context from a second hardware signal from the processing unit;
   determining whether the calling context has direct access permission to the first memory region, based at least in part upon the first context having the inherited access permission; and
   determining whether to allow or deny the memory access request based at least in part on whether the calling context has direct access permission to the first memory region.

13. The method of claim 12, further comprising denying the memory access request in response to the calling context not having direct access permission to the first memory region.

14. The method of claim 12, further comprising allowing the memory access request in response to the calling context having direct access permission to the first memory region.

15. The method of claim 12, further comprising:
   receiving a fetch operation from the processing unit; and parsing information in the fetch operation to determine a link, stack, and zone associated with the fetch operation.

16. The method of claim 15, further comprising:
transmitting a third hardware signal to the processing unit, the third hardware signal including link, stack, and zone information associated with the fetch operation.

17. The method of claim 12, wherein the first context is associated with a library of shared code.

18. An apparatus comprising:
a first register configured to indicate direct access permission with respect to a plurality of contexts;
a second register configured to indicate inherited access permission;
hardware logic configured to enforce access to a plurality of memory regions, wherein the hardware logic is further configured to:
receive an access request for a first memory region of the plurality of memory regions and an identifier of a first context associated with the access request;
determine whether the first context has inherited access permission for the first memory region, including checking the identifier of the first context against information in the second register;
in response to determining that the first context has inherited access permission for the first memory region, determine whether an identifier of a second context, received via a hardware signal from a processor core, has direct access permission to the first memory region according to information in the first register; and
determine whether to allow or deny the access request based at least in part on whether the identifier of the second context has direct access permission to the first memory region.

19. The apparatus of claim 18, wherein the first context is associated with a first link, and wherein the second context is associated with a second link.

20. The apparatus of claim 19, wherein the first link corresponds to a first address range storing a first set of machine code instructions and data, and wherein the second link corresponds to a second address range storing a second set of machine code instructions and data, wherein the first address range and the second address range are different.

* * * * *